(12) United States Patent
Benveniste

(10) Patent No.: US 8,665,714 B2
(45) Date of Patent: Mar. 4, 2014

(54) CALL ADMISSION CONTROL OF SHARED-ACCESS RESOURCES THROUGH A CALL-HANDLING SERVER

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1317 days.

(21) Appl. No.: 11/318,162

(22) Filed: Dec. 23, 2005

(65) Prior Publication Data

US 2006/0116128 A1    Jun. 1, 2006

Related U.S. Application Data

(63) Continuation-in-part of application No. 10/869,801, filed on Jun. 16, 2004, now Pat. No. 8,223,637.

(51) Int. Cl.
*H04J 1/16* (2006.01)
*H04J 3/14* (2006.01)

(52) U.S. Cl.
USPC ............................. 370/230; 370/235; 370/236

(58) Field of Classification Search
USPC .................. 370/395.2, 395.21, 229–234; 709/227–229
See application file for complete search history.

(56) References Cited

U.S. PATENT DOCUMENTS

| | | | |
|---|---|---|---|
| 6,708,034 B1 * | 3/2004 | Sen et al. | 455/445 |
| 7,330,453 B1 | 2/2008 | Borella et al. | |
| 7,366,152 B2 | 4/2008 | O'Neill et al. | |
| 7,366,780 B2 | 4/2008 | Keller et al. | |
| 7,643,442 B1 * | 1/2010 | Calhoun | 370/328 |
| 7,684,322 B2 * | 3/2010 | Sand et al. | 370/230 |
| 2002/0133600 A1 | 9/2002 | Williams et al. | |
| 2002/0191597 A1 * | 12/2002 | Lundstrom | 370/356 |
| 2003/0092444 A1 | 5/2003 | Sengodan et al. | |
| 2003/0123388 A1 | 7/2003 | Bradd | |
| 2003/0134642 A1 | 7/2003 | Kostic et al. | |
| 2003/0202469 A1 | 10/2003 | Cain | |
| 2004/0008627 A1 | 1/2004 | Garg et al. | |
| 2004/0008632 A1 | 1/2004 | Hsu et al. | |
| 2004/0082363 A1 | 4/2004 | Hosein | |
| 2005/0063324 A1 | 3/2005 | O'Neill et al. | |
| 2005/0195741 A1 * | 9/2005 | Doshi et al. | 370/230 |
| 2006/0045132 A1 * | 3/2006 | Metke | 370/477 |

(Continued)

OTHER PUBLICATIONS

Win, Aung T., "U.S. Appl. No. 11/318,168 Office Action Sep. 18, 2008",, Publisher: USPTO, Published in: US.

(Continued)

*Primary Examiner* — Ajit Patel
(74) *Attorney, Agent, or Firm* — Anderson Gorecki & Rouille LLP

(57) ABSTRACT

A method and an apparatus are disclosed that enable call admission control for telecommunications terminals that use shared-access resources, without relying on an implementation at every access point to provide those resources. In particular, in accordance with the illustrative embodiment of the present invention, a first wireless terminal calls a second terminal by transmitting a traffic stream description that specifies the nature of the call to an intermediary call-handling server, such as a Session Initiation Protocol (SIP) proxy server. The SIP proxy determines from the Internet Protocol address of the calling terminal that the terminal uses a shared-access resource—in this case, a wireless shared-communications channel—and makes a request to a channel utilization manager to admit the call. Subsequently, the SIP proxy receives a message from the channel utilization manager that indicates whether the call has been admitted.

20 Claims, 13 Drawing Sheets

(56) References Cited

U.S. PATENT DOCUMENTS

2006/0080407 A1* 4/2006 Rengaraju .................... 709/219
2006/0239247 A1* 10/2006 Postmus ....................... 370/352
2007/0036093 A1* 2/2007 Newberg et al. ............. 370/260
2007/0118881 A1* 5/2007 Mitchell et al. .................. 726/4
2009/0116478 A1* 5/2009 Hurtta et al. ................. 370/389

OTHER PUBLICATIONS

Win, Aung T, "U.S. Appl. No. 11/318,168 Office Action Mar. 9, 2009", , Publisher: USPTO, Published in: US.
Win, Aung T., "U.S. Appl. No. 11/318,168 Examiner's Answer to Appeal Brief Feb. 19, 2010", , Publisher: USPTO, Published in: US.
Win, Aung T., "U.S. Appl. No. 10/869,801 Office Action Nov. 28, 2008", , Publisher: USPTO, Published in: US.
Win, Aung T., "U.S. Appl. No. 10/869,801 Office Action Dec. 30, 2009", , Publisher: USPTO, Published in: US.
Win, Aung T., "U.S. Appl. No. 10/869,801 Office Action Jan. 29, 2008", , Publisher: USPTO, Published in: US.
Win, Aung T., "U.S. Appl. No. 10/869,801 Office Action Apr. 28, 2009", , Publisher: USPTO, Published in: US.
Win, Aung T., "U.S. Appl. No. 10/869,801 Office Action May 14, 2010", , Publisher: USPTO, Published in: US.
Win, Aung T., "U.S. Appl. No. 10/869,801 Office Action Sep. 2, 2010", , Publisher: USPTO, Published in: US.
Win, Aung T., "U.S. Appl. No. 10/869,801 Office Action Mar. 7, 2011", , Publisher: USPTO, Published in: US.

* cited by examiner

CALL ADMISSION CONTROL OF SHARED-ACCESS RESOURCES THROUGH A CALL-HANDLING SERVER

REFERENCE TO RELATED APPLICATIONS

This application is a continuation-in-part of U.S. patent application Ser. No. 10/869,801, filed on 16 Jun. 2004, entitled "Quality-of-Service and Call Admission Control," now pending, which is also incorporated herein by reference.

This application also incorporates by reference U.S. patent application Ser. No. 11/317,514, filed on 23 Dec. 2005, entitled "Call Admission Control for Mobility-Capable Telecommunications Terminals."

FIELD OF THE INVENTION

The present invention relates to telecommunications in general, and, more particularly, to admitting a call in a shared-access system.

BACKGROUND OF THE INVENTION

FIG. 1 depicts a diagram of telecommunications system 100 in the prior art. Telecommunications system 100 comprises wireless telecommunications terminals 101 and 102; access points 103-1 through 103-M that serve basic service areas 110-1 through 110-M, respectively, wherein M is a positive integer; server 105; telecommunications terminal 106; and telecommunications network 120, interconnected as shown.

Telecommunications system 100 is capable of Session Initiation Protocol (or "SIP") signaling. SIP is a standard protocol for initiating an interactive user session (i.e., a "call") that involves multimedia elements such as voice, chat, video, and so forth.

Basic service area 110-$m$, for m=1 through M, is the service area in which shared access of other nodes in telecommunications system 100 is provided to telecommunications terminals such as terminals 101 and 102. As depicted in FIG. 1, basic service area 110-$m$ is in an IEEE 802.11 wireless local area network. In area 110-$m$, the one or more wireless telecommunications terminals that make up the basic service set of area 110-$m$ are able to access other nodes in system 100 via a shared-communications channel supported by access point 103-$m$.

Telecommunications network 120 is a telecommunications network such as the Internet, the Public Switched Telephone Network (PSTN), and so forth. Network 120 comprises or is connected to one or more transmission-related nodes such as gateways, routers, or switches that are used to direct packets from one or more sources to the correct destinations of those packets.

The service provided by the path that links a first node with a second node is characterized by its "quality of service," which, for the purposes of this specification, is defined as a function of the bandwidth, error rate, and latency from one node to another. For example, a shared-communications channel that links a wireless terminal such as terminal 101 with an access point such as access point 103-1 is subject to a quality-of-service level.

For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

Each of telecommunications terminals 101 and 102, as well as terminal 106, is a communications device such as a local area network telephone, a notebook computer, a personal digital assistant [PDA], a tablet PC, and so forth. Each telecommunications terminal has an associated contact identifier (e.g., telephone number, email address, Internet Protocol address, etc.) that uniquely identifies that terminal in the address space of telecommunications system 100. Terminals 101 and 102 communicate, through one or more access points 103-1 through 103-M, with other telecommunications terminals that have connectivity with network 120, such as terminal 106. For example, terminal 101 is presently associated with access point 103-1 as depicted in FIG. 1 and uses the corresponding shared-communications channel to communicate wirelessly with other devices. In order to communicate, a user at a first telecommunications terminal in system 100, such as terminal 101, places a "call" (e.g., voice call, email, text chat, video, etc.) to a user at a second terminal in system 100, such as terminal 106. Terminals 101 and 102 are also capable of communicating with each other with call control signaling being routed through one or more nodes connected to network 120, as described below.

Server 105 is a Session Initiation Protocol (SIP) proxy server that interacts with other nodes in setting up and managing calls; server 105's role in handling a call is represented by the prior-art message flow depicted in FIG. 2. In the message flow, the user of telecommunications terminal 101 is calling a user at telecommunications terminal 106. Terminal 101's user enters a command into terminal 101 to place a call (e.g., a voice telephone call, a video conference, a text-based instant message [IM], etc.) to the other user. Terminal 101 transmits message 201, a SIP INVITE message, to server 105. Message 201 comprises (i) a traffic stream description (e.g., a SIP Real-Time Protocol [RTP] payload type, etc.) that specifies the nature of the call and (ii) the user identifier of the person being called.

Server 105 determines which terminal is currently associated with the user identifier of the called user (i.e., the "destination terminal"), and transmits message 202 (e.g., a SIP OPTIONS message, etc.) to the destination terminal, in this case terminal 106, to determine the capabilities of that terminal (e.g., whether the destination terminal supports certain types of media, etc.).

Server 105 also transmits response message 203 (e.g., a SIP TRYING message, etc.) back to wireless terminal 101, indicating that the server is attempting to set up the call.

Destination terminal 106 transmits message 204 to server 105 (e.g., a SIP OK message, etc.), in response to message 202, and server 105 informs calling terminal 101 via message 205 that destination terminal 106 is able to participate in the call. Terminal 101 then acknowledges having received message 205 via messages 206 and 207, and terminals 101 and 106 start exchanging traffic packets in real-time protocol (RTP) stream 208.

Although the prior-art message flow in FIG. 2 depicts how a call is set up, what is missing from the message flow is how to determine whether to admit the call in the first place. Call admission control is necessary, considering that terminal 101 is also competing with other terminals in its basic service area (i.e., area 101-1) for the shared-communications channel provided by access point 103-1. In fact, each of access points 103-1 through 103-M has to be able to handle multiple traffic streams, each of which comprising a series of packets, that are transmitted to or from wireless terminals via the corresponding shared-communications channel. However, access point 103-*m* itself may or may not be capable of handling the requests from an associated wireless terminal to admit such a traffic stream. Even if access point 103-*m* provides call admission control, the added call admission functionality can add cost to each access point. Therefore, the need exists to provide the call admission control functionality that is necessary to handle multiple traffic streams on a shared-communications channel, while ensuring an acceptable quality-of-service level, without some of the disadvantages in the prior art.

SUMMARY OF THE INVENTION

The present invention enables call admission control for telecommunications terminals that use shared-access resources, without relying on an implementation at every access point to provide those resources. In particular, in accordance with the illustrative embodiment of the present invention, a first wireless terminal calls a second terminal by transmitting a traffic stream description that specifies the nature of the call to an intermediary call-handling server, such as a Session Initiation Protocol (SIP) proxy server. The SIP proxy determines from the Internet Protocol address of the calling terminal that the terminal uses a shared-access resource—in this case, a wireless shared-communications channel—and makes a request to a channel utilization manager to admit the candidate call.

The channel utilization manager determines whether the amount of a communications resource that is currently available is sufficient to support the candidate call. The channel utilization manager then notifies the SIP proxy as to whether the candidate call is accepted or rejected. The SIP proxy either continues to set up the call or aborts the call setup.

The technique of the present invention is advantageous over that of the prior art because the access points that provide that shared-access resources do not have to also provide the call admission control functionality, thereby lowering the cost of each access point. As there are often many access points in a telecommunications system, the cost savings associated with the present invention can be significant in comparison to the prior art. Furthermore, the amount of logic added to the SIP proxy is minimal and straightforward. In addition, the channel utilization manager either can be its own data-processing system or can be collocated with another function that resides in another data-processing system.

The illustrative embodiment of the present invention comprises receiving, at a Session Initiation Protocol proxy server, a first Session Initiation Protocol-encoded message for a candidate call from a first telecommunications terminal, wherein the first Session Initiation Protocol-encoded message specifies a first data-transmission requirement for the candidate call; transmitting a first request message, based on the first Session Initiation Protocol-encoded message, that requests admission for the candidate call and comprises the first data-transmission requirement; and receiving an acceptance message in response to the first request message that indicates that the candidate call is admitted.

DETAILED DESCRIPTION

The following terms are defined for use in this Specification, including the appended claims:

The term "data-transmission requirement," and its inflected forms, is defined as a requirement for the proper transmission of data, wherein the data transmission occurs via a communications resource, such as a wireless shared-communications channel. Examples of data-transmission requirements include the data periodicity to be maintained, quality-of-service requirements (i.e., related to bandwidth required, maximum error rate, and maximum latency), and so forth. The required bandwidth refers to the data rate, or the channel time, that is required for the traffic stream of data to be transmitted.

The term "traffic stream description," and its inflected forms, is defined as the information that specifies the data-transmission requirements, either explicitly or implicitly. For example, instead of explicitly stating a requirement (e.g., data rate of 1 Mbps, etc.), the traffic stream description might identify the codec, as is known in the art, to be used by a wireless terminal during a call, wherein the particular choice of codec implies a certain bandwidth requirement for the call. A telecommunications terminal that is preparing to communicate data originates the traffic stream description.

The term "call," and its inflected forms, is defined as a communication of user information between two or more telecommunications terminals. Examples of a call are a voice telephone call, an email, a text-based instant message [IM] session, a video conference, etc.

The term "communications resource usage," and its inflected forms, is defined as data that characterizes usage of a communications resource (e.g., percentage of channel time used, etc.) associated with a communications medium, such as a wireless shared-communications channel.

Figure 1:
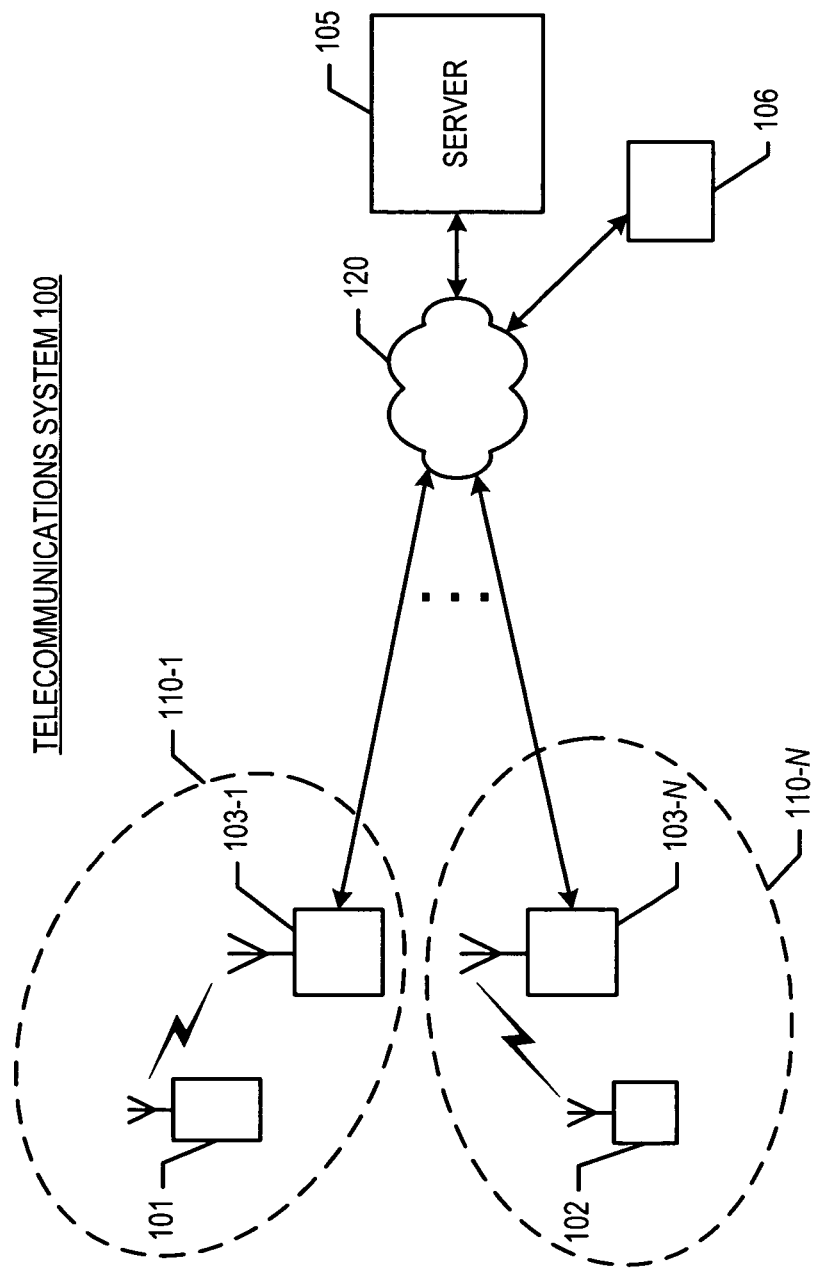
FIG. 1 depicts a diagram of telecommunications system 100 in the prior art.
Figure 2:
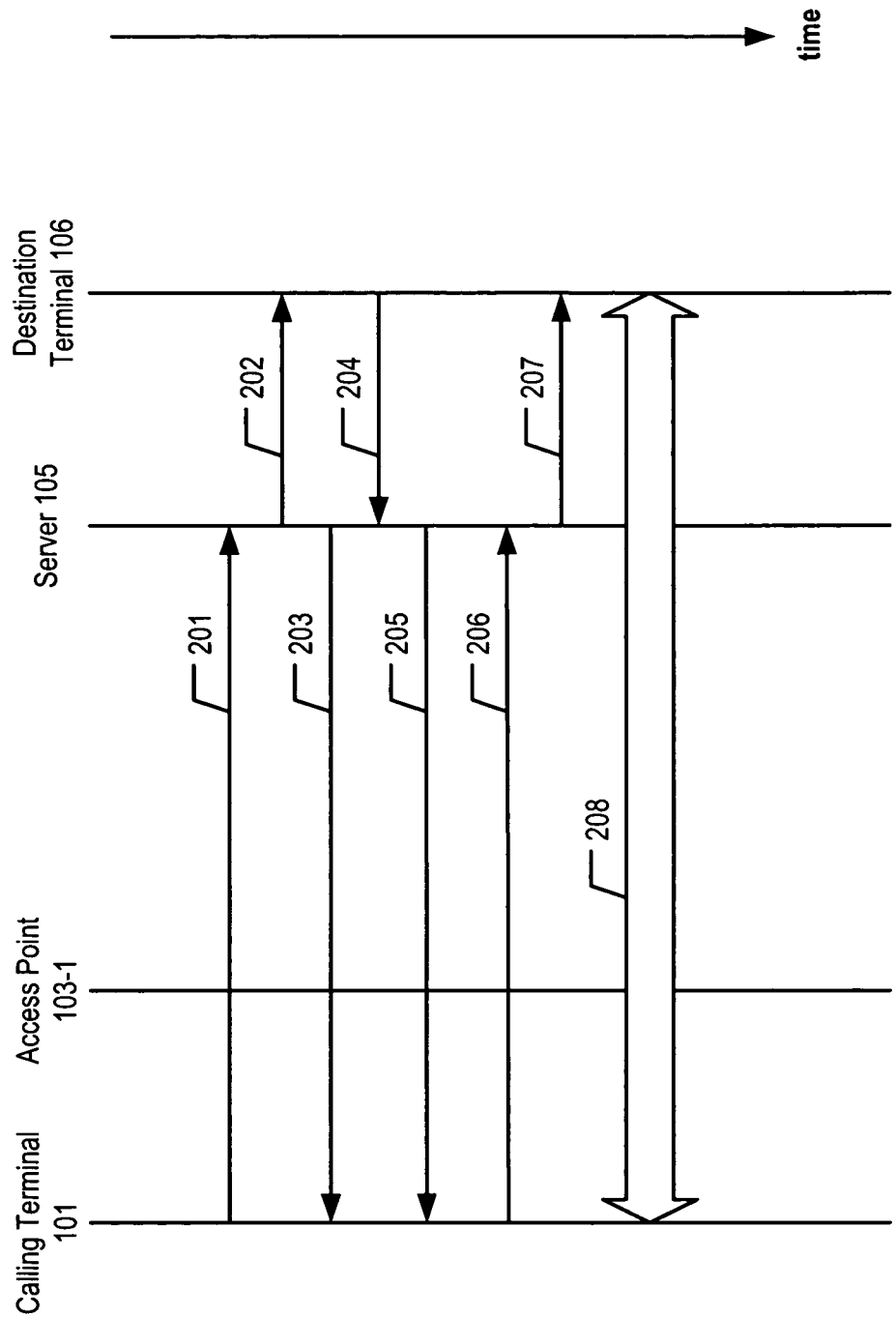
FIG. 2 depicts a diagram of the prior-art message flow associated with the user of telecommunications terminal 101 calling a user at telecommunications terminal 106.
Figure 3:
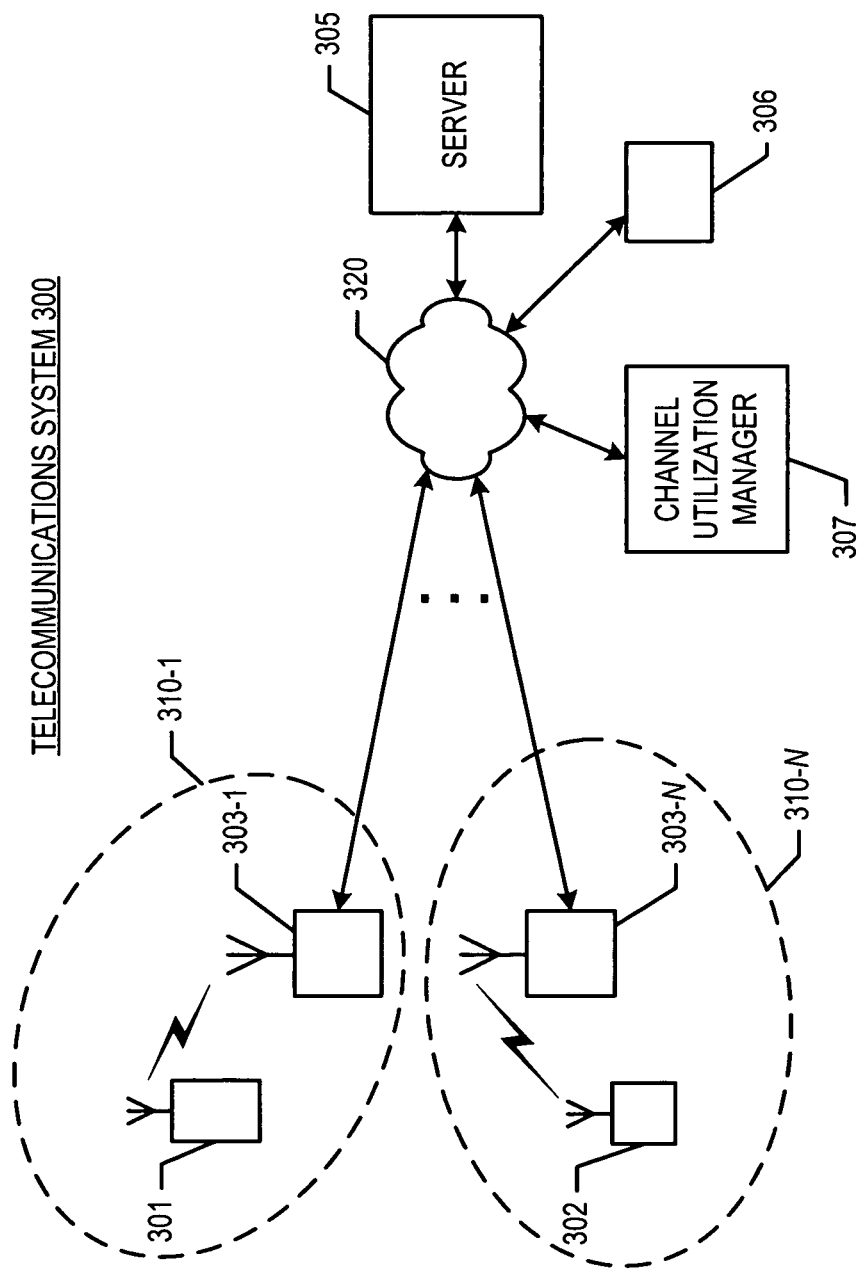
FIG. 3 depicts a diagram of telecommunications system 300 in accordance with the illustrative embodiment of the present invention.

FIG. 3 depicts a diagram of telecommunications system 300 in accordance with the illustrative embodiment of the present invention. Telecommunications system 300 comprises wireless telecommunications terminals 301 and 302; access points 303-1 through 303-N that serve basic service areas 310-1 through 310-N, respectively, wherein N is a positive integer; server 305; telecommunications terminal 306; channel utilization manager 307; and telecommunications network 320, interconnected as shown.

Telecommunications system 300 is capable of Session Initiation Protocol-based (SIP-based) signaling, in accordance with the illustrative embodiment. It will be clear to those who are skilled in the art how to apply the present invention to some alternative embodiments that use other types of call-control signaling, such as H.323, as is known in the art.

Basic service area 310-n, for n=1 through N, is in a telecommunications network that provides shared access of other nodes in telecommunications system 300 to telecommunications terminals such as terminals 301 and 302. As depicted in FIG. 3, area 310-n is in an IEEE 802.11 wireless local area network, in accordance with the illustrative embodiment. As those who are skilled in the art will appreciate, however, area 310-n in some alternative embodiments can be in another type of shared-access network, such as an Ethernet network or cable modem-based network, either wired or wireless. In area 310-n, shared access is provided to one or more wireless telecommunications terminals via a shared-communications channel that is supported by corresponding access point 303-n.

Telecommunications network 320 is a telecommunications network such as the Internet, the Public Switched Telephone Network (PSTN), and so forth. Network 320 comprises or is connected to one or more transmission-related nodes such as gateways, routers, or switches that are used to direct packets from one or more sources to the correct destinations of those packets.

Each of telecommunications terminals 301 and 302, as well as terminal 306, is a communications device such as a local area network telephone, a notebook computer, a personal digital assistant [PDA], a tablet PC, and so forth, and has a contact identifier. Terminals 301 and 302 are assigned fixed Internet Protocol addresses and, as wireless stations, are assigned Internet Protocol addresses from a pre-specified block of addresses. Terminals 301 and 302 communicate, through one or more access points 303-1 through 303-N, with other telecommunications terminals that have connectivity with network 320, such as terminal 306. For example, terminal 301 is associated with access point 303-1 as depicted in FIG. 3 and uses the corresponding shared-communications channel to communicate wirelessly with other devices. In order to communicate, a user at a first telecommunications terminal in system 300, such as terminal 301, places a "call" (e.g., voice call, email, text chat, video, etc.) to a user at a second terminal in system 300, such as terminal 306. Terminals 301 and 302 are also capable of communicating with each other with the attendant call control signaling being routed through one or more nodes connected to network 320, as described below. It will be clear to those skilled in the art how to make and use terminals 301, 302, and 306.

Access point 303-n, wherein n has a value of between 1 and N, inclusive, is an access point as is known in the art that exchanges packets that convey data (e.g., control messages, voice traffic, video streams, etc.) with one or more wireless telecommunications terminals, such as terminals 301 and 302, via its shared-communications channel. Access point 303-n, in well-known fashion, employs a contention-based protocol (e.g., IEEE 802.11 DCF, etc.) for ensuring that a wireless terminal or access point can gain exclusive access to the shared-communications channel for an interval of time in order to transmit packets.

Access point 303-n also has to be able to handle traffic streams, each of which comprising a series of packets, that are transmitted to or from wireless terminals via the shared-communications channel. In accordance with the illustrative embodiment, some of access points 303-1 through 303-N are capable of handling the requests from an associated wireless terminal to admit such a traffic stream, while some of access points 303-1 through 303-N are not. In the polled access (i.e., a contention-free access) mode that is part of the IEEE 802.11e set of protocols, as is known in the art, access point 303-n is able to track the utilization of its shared-communications channel. In the distribution access (i.e., a contention-based access) mode, however, access point 303-n is not required to track the channel utilization; furthermore, terminals that use the distribution access mode are not required to request call admission onto the shared-communications channel. Therefore, manager 307 hosts the call admission control functionally to ensure that the utilization of all shared-communications channels in areas 310-1 through 310-N is managed, in accordance with the illustrative embodiment and as described later. In any event, it will be clear to those skilled in the art how to make and use access point 303-n.

Server 305 is a Session Initiation Protocol (SIP) proxy server, as is known in the art, the salient components of which are described below and with respect to FIG. 4. In accordance with the illustrative embodiment of the present invention, server 305 also transmits information to channel utilization manager 307 that the manager uses to determine whether a call should be allowed or not on a shared-communications channel. How server 305 interacts with other nodes in setting up and managing calls is described below and with respect to FIGS. 6 through 13.

Server 305 is a SIP proxy server in the illustrative embodiment. As those who are skilled in the art will appreciate, in some alternative embodiments, server 305 can be a different type of server such as another type of SIP server or another type of call-control server that uses a different protocol (e.g., H.323, etc.). In any event, it will be clear to those skilled in the art, after reading this specification, how to make and use server 305.

In accordance with the illustrative embodiment, channel utilization manager 307 provides the admission control to handle requests to add traffic streams that utilize the shared-communications channels of access points 303-1 through 303-N. The salient components of manager 307 are described below and with respect to FIG. 5. If, for example, the channel utilization of a particular shared-communications channel exceeds a predetermined level, manager 307 may disallow a new call on that channel.

Manager 307 is able to receive the following information from the specified nodes:

i. a registration, from access point 303-*n*;

ii. a notification that a terminal has associated with access point 303-*n*;

iii. a message that contains the physical data rate that is supported by a terminal active in a call, where the message can be sent repeatedly to update the data rate;

iv. a notification that a terminal has disassociated from access point 303-*n*;

v. a measurement of the shared-communications channel quality (e.g., noise, collision rate, frame or bit error rate, etc.), from access point 303-*n*;

vi. the bandwidth that is committed through IEEE 802.11e traffic specifications (TSPEC), as are known in the art, to traffic streams that do not involve server 305 (e.g., direct link protocol [DLP] transmissions, etc.);

vii. a resource reservation request for a particular call, from server 305; and viii. a notification of the ending of a particular call, from server 305.

In addition, manager 307 is able to transmit the following information to the specified nodes:

i. a resource reservation response for a particular call, to server 305; and ii. a notification that an existing call is being rejected, to server 305.

How manager 307 interacts with access points 303-1 through 303-N and server 305 in admitting and enabling calls is described below and with respect to FIGS. 6 through 13. It will be clear to those skilled in the art, after reading this specification, how to make and use manager 307.

As depicted in FIG. 3, one SIP proxy server is provisioned with one channel utilization manager and N access points. As those who are skilled in the art will appreciate, however, a different provisioning of server, manager, and access points is possible in system 300. For example, one server might be provisioned with two channel utilization managers, wherein each manager is provisioned with N/2 access points. Call-related information (such as in a call-setup traffic specification, to be described later) is transferred from a first channel utilization manager to a second manager when a call hands over from one access point served by the first manager to another access point served by the second manager.

Figure 4:
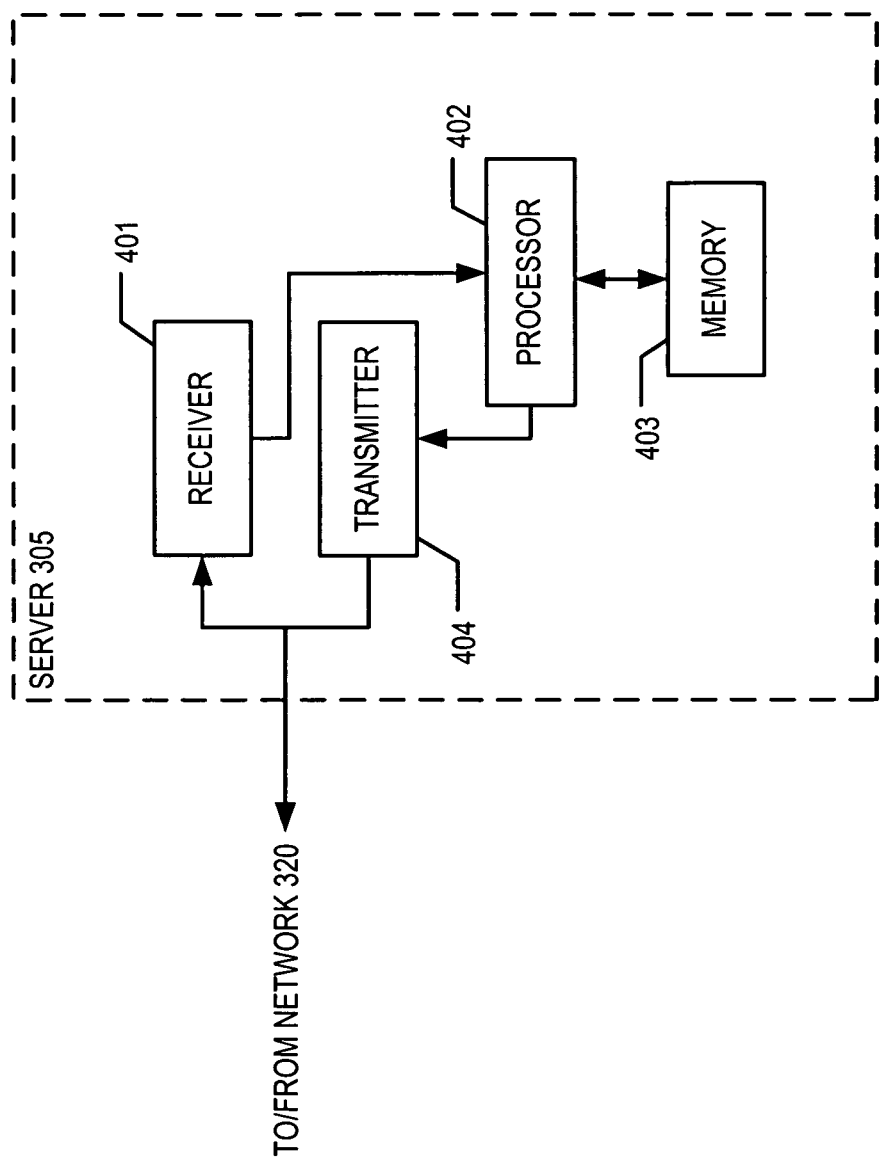
FIG. 4 depicts the salient components of server 305 in accordance with the illustrative embodiment of the present invention.

FIG. 4 depicts the salient components of server 305 in accordance with the illustrative embodiment of the present invention. Server 305 comprises receiver 401, processor 402, memory 403, and transmitter 404, interconnected as shown.

Receiver 401 receives signals from other nodes via network 320 and forwards the information encoded in the signals to processor 402, in well-known fashion. It will be clear to those skilled in the art, after reading this specification, how to make and use receiver 401.

Processor 402 is a general-purpose processor that is capable of receiving information from receiver 401, executing instructions stored in memory 403, reading data from and writing data into memory 403, executing the tasks described below and with respect to FIGS. 6 through 13, and transmitting information to transmitter 404. In some alternative embodiments of the present invention, processor 402 might be a special-purpose processor. In either case, it will be clear to those skilled in the art, after reading this specification, how to make and use processor 402.

Memory 403 stores the instructions and data used by processor 402. Memory 403 might be any combination of random-access memory (RAM), flash memory, disk drive memory, and so forth. It will be clear to those skilled in the art, after reading this specification, how to make and use memory 403.

Transmitter 404 receives information from processor 402 and transmits signals that encode this information to other nodes via network 320, in well-known fashion. It will be clear to those skilled in the art, after reading this specification, how to make and use transmitter 404.

Figure 5:
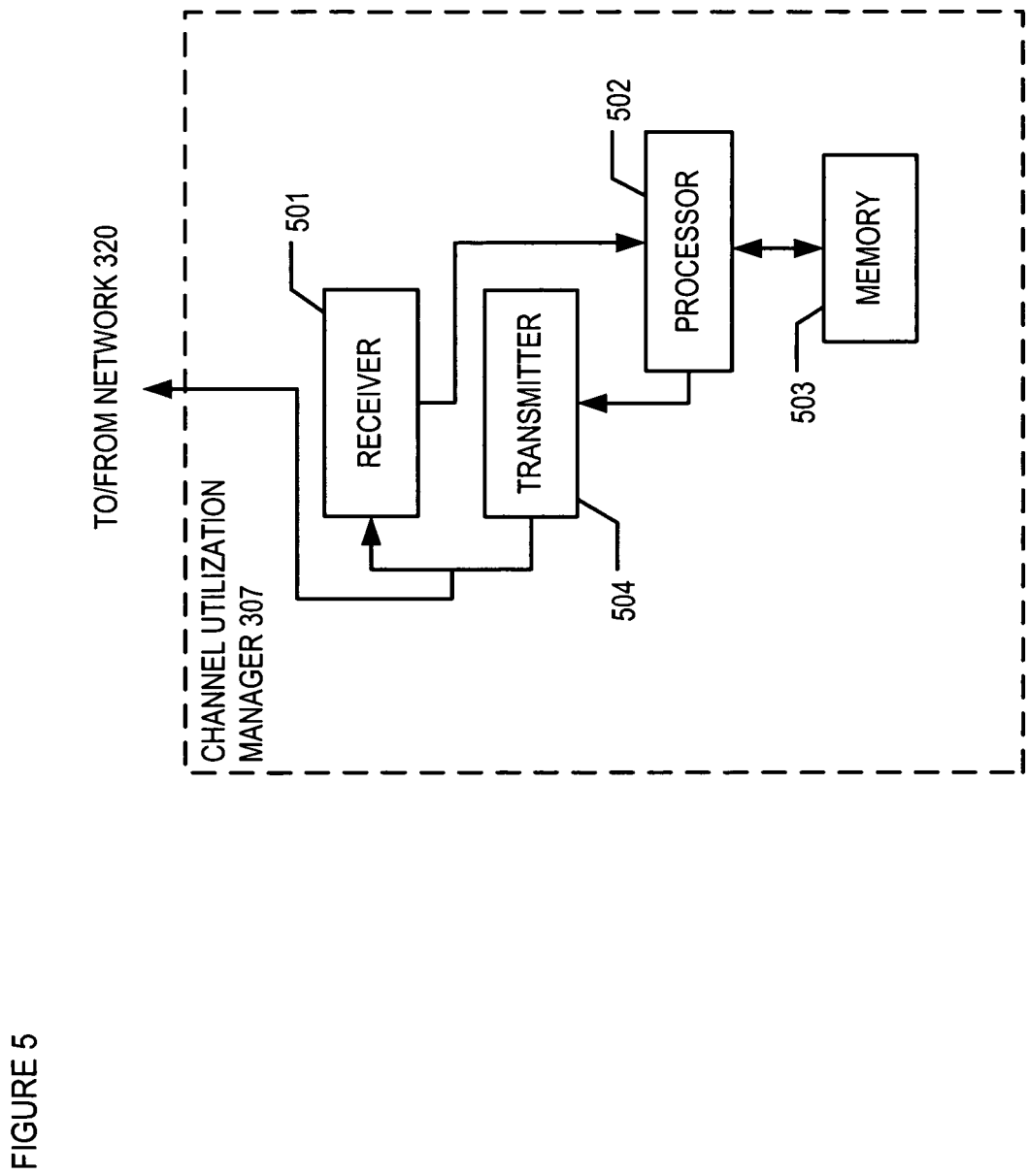
FIG. 5 depicts the salient components of channel utilization manager 307 in accordance with the illustrative embodiment of the present invention.

FIG. 5 depicts the salient components of channel utilization manager 307 in accordance with the illustrative embodiment of the present invention. Manager 307 comprises receiver 501, processor 502, memory 503, and transmitter 504, interconnected as shown.

Receiver 501 receives signals from other nodes via network 320 and forwards the information encoded in the signals to processor 502, in well-known fashion. It will be clear to those skilled in the art, after reading this specification, how to make and use receiver 501.

Processor 502 is a general-purpose processor that is capable of receiving information from receiver 501, executing instructions stored in memory 503, reading data from and writing data into memory 503, executing the tasks described below and with respect to FIGS. 6 through 13, and transmitting information to transmitter 504. In some alternative embodiments of the present invention, processor 502 might be a special-purpose processor. In either case, it will be clear to those skilled in the art, after reading this specification, how to make and use processor 502.

Memory 503 stores the instructions and data used by processor 502. Memory 503 might be any combination of random-access memory (RAM), flash memory, disk drive memory, and so forth. It will be clear to those skilled in the art, after reading this specification, how to make and use memory 503.

Transmitter 504 receives information from processor 502 and transmits signals that encode this information to other nodes via network 320, in well-known fashion. It will be clear to those skilled in the art, after reading this specification, how to make and use transmitter 504.

Figure 6:
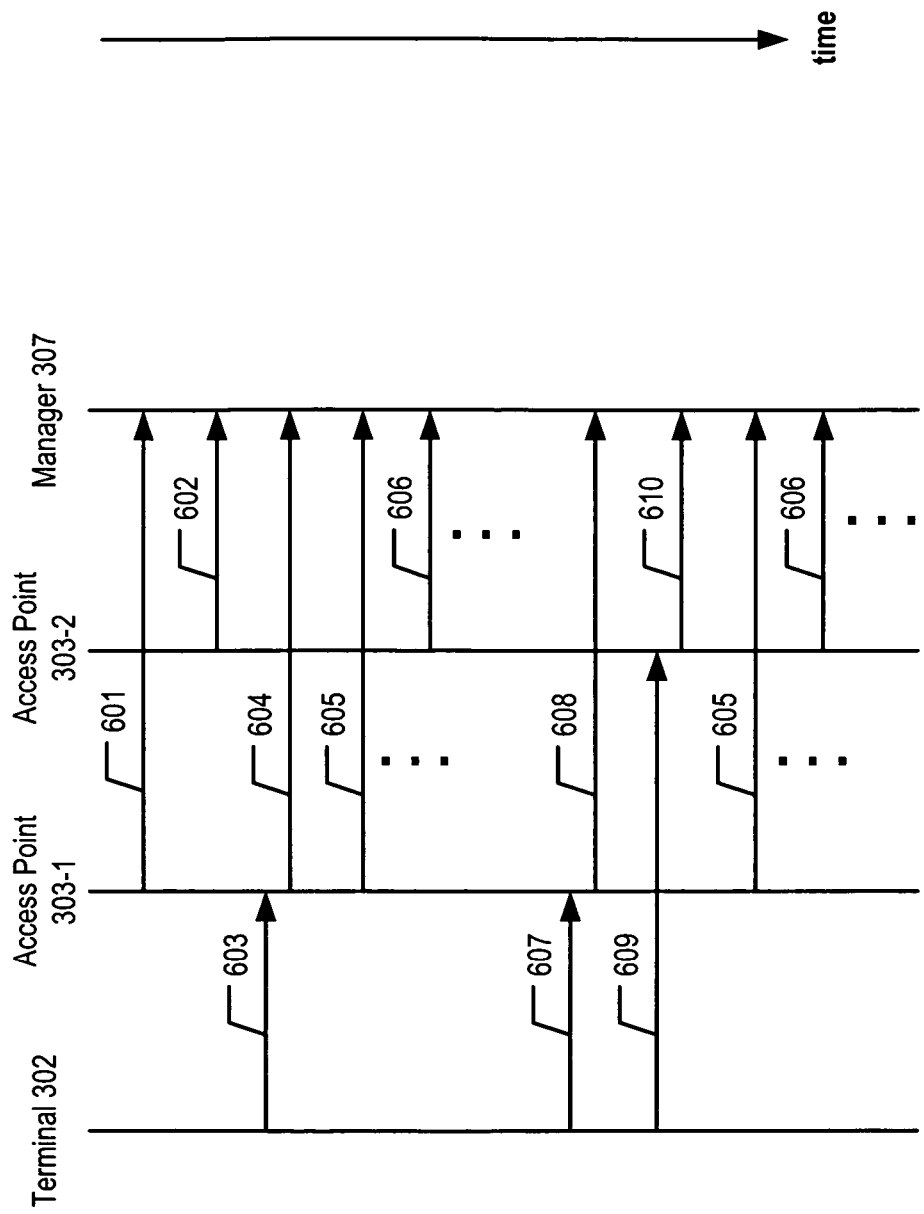
FIG. 6 depicts an illustrative series of messages that are exchanged between (i) access points 303-1 and 303-2 and (ii) channel utilization manager 307 during the course of managing terminal 302.

FIG. 6 depicts an illustrative series of messages that are exchanged between (i) access points 303-1 and 303-2 and (ii) channel utilization manager 307 during the course of managing terminal 302, in accordance with the illustrative embodiment of the present invention. As those who are skilled in the art will appreciate, some of the messages that are depicted in FIG. 6 can be transmitted or received in a different order than that depicted.

When an access point initializes, it registers with channel utilization manager 307. As depicted in FIG. 6, access point 303-1 transmits registration message 601 to manager 307, and access point 303-2 transmits registration message 602 to manager 307. The registration message from each access point identifies the capability of the physical layer of the shared-communications channel (e.g., IEEE 802.11a-capable, IEEE 802.11g-capable, etc.) to manager 307, which uses the information to determine the physical layer data rate for the particular shared-communications channel. The registration message also reports environmental parameters that affect capacity, including background noise, transmission attempt failure rate, and so forth; the access point may also transmit a registration message when an environmental parameter, such as background noise, changes. Furthermore, if there are IEEE 802.11e traffic specifications that are admitted by the access point without server 305 being involved, the access point (e.g., access point 303-1, etc.) reports to manager 307 the total bandwidth committed to all the terminals in the corresponding basic service area (e.g., area 310-1, etc.).

When a telecommunications terminal associates with an access point, the access point updates manager 307. As depicted in FIG. 6, terminal 302 for example associates with access point 303-1 by transmitting message 603; access point 303-1 indicates this to manager 307 by transmitting message 604, which comprises the Internet Protocol address and physical layer capabilities of terminal 302, including the terminal's physical layer data rate. The access point may also transmit message 603 when the physical layer data rate of the terminal changes, which may occur when, for example, the terminal moves closer to or away from the access point.

Meanwhile, in some embodiments, access point 303-1 continually updates manager 307 on the quality of its shared-communications channel or committed bandwidth, or both, by transmitting message 605 either periodically or sporadically. Similarly, in some embodiments, access point 303-2 continually updates manager 307 on the quality of its shared-communications channel or committed bandwidth, or both, by transmitting message 606 either periodically or sporadically.

As depicted in FIG. 6, at some point terminal 302 disassociates with access point 303-1 via message 607 and associates with access point 303-2 via message 609, in well-known fashion. Accordingly, access point 303-1 transmits message 608 in response to disassociation message 607 and access point 303-2 transmits message 610 in response to association message 609. Alternatively, a terminal may dissociate from an access point without sending a message; in this case, inactivity, as determined by the access point, triggers disassociation and causes the access point to update manager 307 about the disassociation.

Message 610 comprises the Internet Protocol address and physical layer capabilities of terminal 302. Terminal 302 maintains the same Internet Protocol address when it associates with the new access point, in this case access point 303-2.

FIGS. 7 through 13 depict message flow diagrams that are related to handling calls between two telecommunications terminals, in which at least one of the terminals uses a shared-communications channel. In accordance with the illustrative embodiment, some or all of the message flow described above and with respect to FIG. 6 may occur concurrently with the message flow depicted in each of FIGS. 7 through 13; for example, channel utilization manager 307 continually receives messages 605 and 606 that report channel quality from access points 303-1 and 303-2, respectively. As those who are skilled in the art will appreciate, some of the messages that appear in each of FIGS. 7 through 13 can be transmitted or received in a different order than the order depicted.

Figure 7:
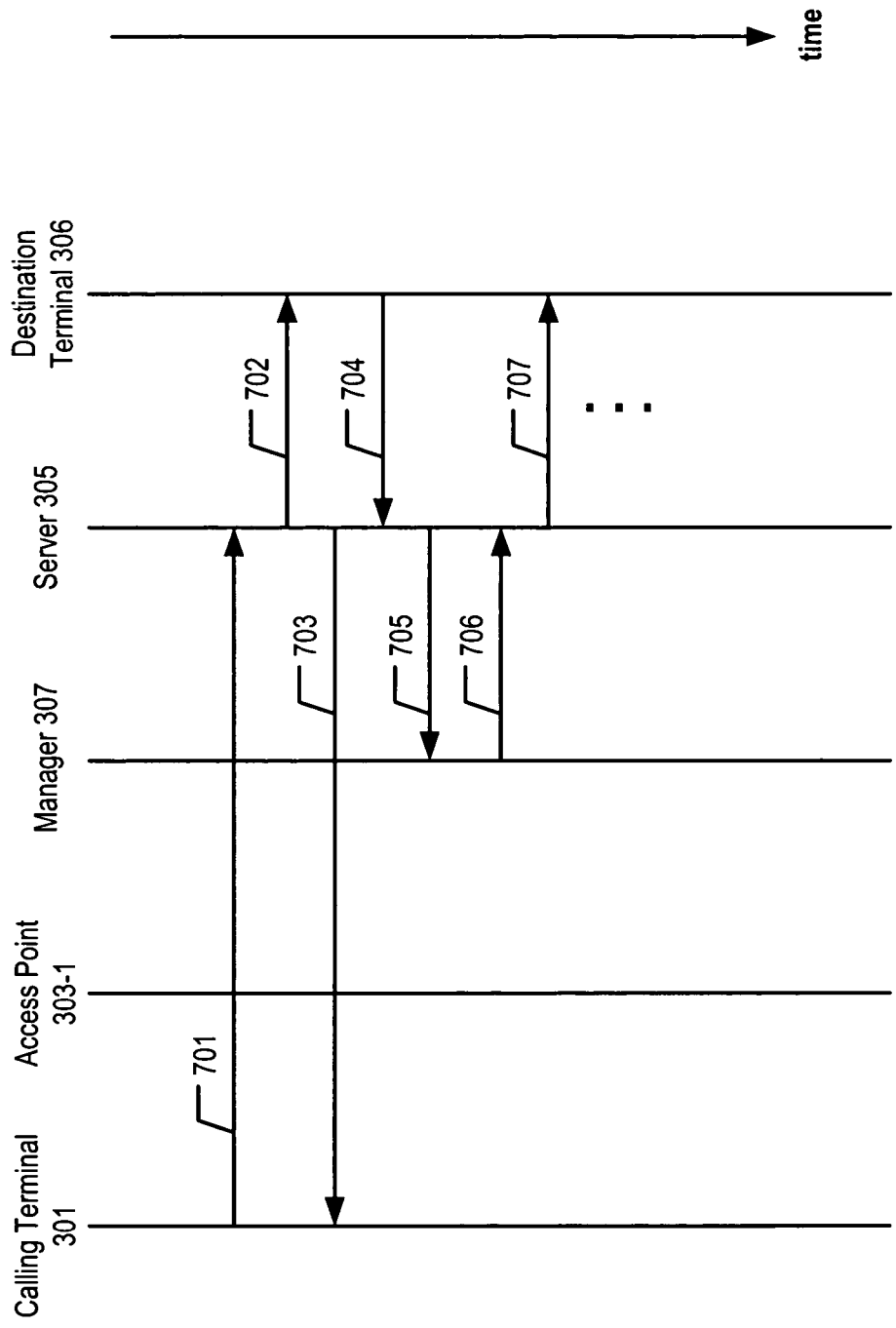
FIG. 7 depicts a diagram of the message flow associated with an example of the user of telecommunications terminal 301 calling a user at telecommunications terminal 306, wherein channel utilization manager 307 accepts the call

FIG. 7 depicts a diagram of the message flow associated with an example of the user of telecommunications terminal 301 calling a user at telecommunications terminal 306, in accordance with the illustrative embodiment of the present invention, wherein channel utilization manager 307 accepts the call. Terminal 301's user initiates the message flow by entering a command into terminal 301 to place a call to the other user. Terminal 301 transmits message 701, a SIP INVITE message, to server 305. Message 701 comprises (i) a traffic stream description (e.g., a SIP Real-Time Protocol [RTP] payload type, etc.) that specifies the nature of the call and (ii) the user identifier of the person being called. The traffic stream description also includes one or more data-transmission requirements (e.g., required bandwidth, etc.), as part of a media description for the candidate call.

Server 305 determines which terminal is currently associated with the user identifier of the called user (i.e., the "destination terminal"), and transmits message 702, a SIP OPTIONS message, to the destination terminal, in this case terminal 306, to determine the capabilities of that terminal (e.g., whether the destination terminal supports certain types of media, etc.). Server 305 also determines, in well-known fashion, from the calling terminal's Internet Protocol address that the server should remain on the signaling path that was used to receive the SIP INVITE message. Telecommunications system 300 uses the Record-Route header mechanism, as is well-known in the art, to indicate to server 305 that it will be a "call-stateful" proxy for the call. Accordingly, server 305 remains on the signaling path for at least part of the call, if admitted, in accordance with the illustrative embodiment.

Server 305 also transmits response message 703, a SIP TRYING message, back to wireless terminal 301, indicating that the server is attempting to set up the call.

Destination terminal 306 transmits message 704 to server 305 (e.g., a SIP OK message, etc.) in response to message 702.

Server 305 determines that terminal 301 is wireless and is served by an access point that is managed by channel utilization manager 307, and that manager 307 has to therefore be notified of the candidate call. Server 305 determines terminal 301's access method by checking terminal 301's Internet Protocol address against a list of addresses that correspond to terminals associated with wireless local area networks. As those who are skilled in the art will appreciate, server 305 can determine terminal 301's access method through other means in some alternative embodiments.

Subsequent to determining terminal 301's call dependency on manager 307, server 305 transmits message 705 to manager 307. Message 705 is a call setup traffic specification, which comprises an admission request with a description of the traffic stream with one or more data-transmission requirements (e.g., periodicity, required data rate, etc.). In some alternative embodiments, server 305 generates a communication resource requirement (e.g., bandwidth utilization, etc.) of how much of the resource that manager 307 manages is needed to achieve a data-transmission requirement; server 305 then transmits that requirement as part of message 705.

Channel utilization manager 307 receives message 705 from server 305 and stores the received call setup traffic specification in a newly created record associated with the call. Manager 307 then determines whether it should admit the call on the shared-communications channel, in accordance with the illustrative embodiment of the present invention, as will now be described.

In determining whether to admit the call, manager 307 first examines the one or more data-transmission requirements received as part of the call setup traffic specification and translates those data-transmission requirements to communications resource requirements. For example, a received requirement of the candidate call's data rate might translate to a certain amount of bandwidth utilization to be allocated to the call. In accordance with the illustrative embodiment, manager 307 uses a statistically-justified, fixed bandwidth utilization value to represent the actual bandwidth that is to be used by terminal 301's codec, as is known in the art.

In reality, as terminal 301 moves closer to or away from access point 303-1, the terminal can change the actual data rate that it uses to communicate; consequently, the actual bandwidth that is utilized by the corresponding call changes. It can be problematic in the prior art to have to continually consider the mobility-induced variation in bandwidth utilization during call admission control. This is because (i) the variation of bandwidth utilization per call as a function of time cannot be predicted and (ii) a terminal involved in a call and that is initially close to (or far from) an access point may move away from (or closer to) the access point during the call. The present invention recognizes that it is also unnecessary to consider the variation in bandwidth utilization, if a fixed bandwidth utilization value is carefully selected to represent a given codec. The criterion for admitting a new call must account for the statistical variation in bandwidth utilization due to mobility. For instance, a statistically-justified, fixed value for the bandwidth utilization for each codec identified in the traffic stream description can be used by manager 307 when it considers the probabilistic nature of the admission decision, in accordance with the illustrative embodiment of the present invention.

The parameters that manager 307 uses in determining whether to admit the call include:
  i. the communications resource requirement of the candidate call under consideration (e.g., the fixed bandwidth utilization value, etc.), which manager 307 derives from the data-transmission requirement that it receives in message 705;
  ii. the amount already allocated of the shared-access resource to existing calls (i.e., the current communications resource usage); and
  iii. the total capacity of the shared-access resource being allocated (e.g., the total bandwidth, etc.), which manager 307 derives, at least in part, from the physical layer data rate of the shared-communications channel described above with respect to FIG. 6.

In accordance with the illustrative embodiment, manager 307 maintains, for each shared-communications channel, a database that tracks the resource utilization associated with each call that is currently using the shared-communications channel. Manager 307 also maintains a running total of the individual resource utilization amounts, on a per-channel basis. Manager 307 is able to derive the amount of bandwidth remaining, from the amount of bandwidth in use. When a call setup traffic specification is received from server 305 for a candidate call, manager 307 determines whether there would be enough capacity remaining on the shared-communications channel resource if the candidate call were to be added.

For example, assuming that all calls have the same communications resource requirement (i.e., use the same codec), manager 307 accepts the Ith call if:
  i. The probability that the resulting quality-of-service will be satisfactory is greater than a threshold T1, given that J calls are admitted; and
  ii. The probability is greater than a threshold T2 that the total communications resource requirement for all J calls is less than or equal to the maximum channel capacity, BW;
wherein threshold levels T1 and T2 can vary from one call being considered (e.g., a new call, etc.) to another (e.g., a handover-related call, etc.). As reflected in the example, manager 307 considers accepting the jth call based on the probabilistic nature of the admission decision. As those who are skilled in the art will appreciate, when multiple codecs are used the per-call resource requirement is different for each codec.

In some embodiments, manager 307 determines whether to admit the call by also considering: (i) the level of utilization above which a call is to be rejected, and (ii) whether the candidate call is a new call or a handover-related call that is described below and with respect to FIG. 12, which determines the level of utilization to be applied.

Manager 307 is also capable of fine-tuning various parameters. In some embodiments, manager 307 may use the received measurements of channel quality (e.g., background noise, collision rate, etc.) for each shared-communications channel to adjust the maximum channel capacity, BW, as needed. The channel quality measurements are described above with respect to FIG. 6. Manager 307, in some other embodiments, may also adjust the maximum channel capacity by considering the bandwidth that is committed through IEEE 802.11e traffic specifications to traffic streams that do not involve server 305. Manager 307, in still some other embodiments, may track the discrepancy between the actual and estimated shared-access resources that are required for a call and might adjust the per-call resource requirement accordingly.

In the illustrative message flow depicted in FIG. 7, manager 307 determines that the candidate call is to be admitted. As a result, manager 307 (i) notes the additional call and the accompanying utilization in its database (i.e., sets or otherwise changes the value of a flag that signifies call admittance) and (ii) transmits acceptance message 706 to server 305, indicating that the candidate call is admitted.

Server 305 then transmits message 707, a SIP INVITE message, to destination terminal 306. Subsequently, server 305 continues to set up the call between terminals 301 and 306 in well-known fashion.

In some alternative embodiments, server 305 and manager 307 can handle a provisional reservation of channel utilization, such as when a traffic stream description is not available prior to call setup. In doing so, server 305 indicates in message 705 that the reservation is provisional. Manager 307 then uses typical resource requirements to determine whether to admit the call. Later, server 305 updates manager 307 with data-transmission requirements to determine the actual resource requirement, and manager 307 decides whether to continue allowing the existing call on the shared-communications channel that is being utilized or to reject the existing call.

Figure 8:
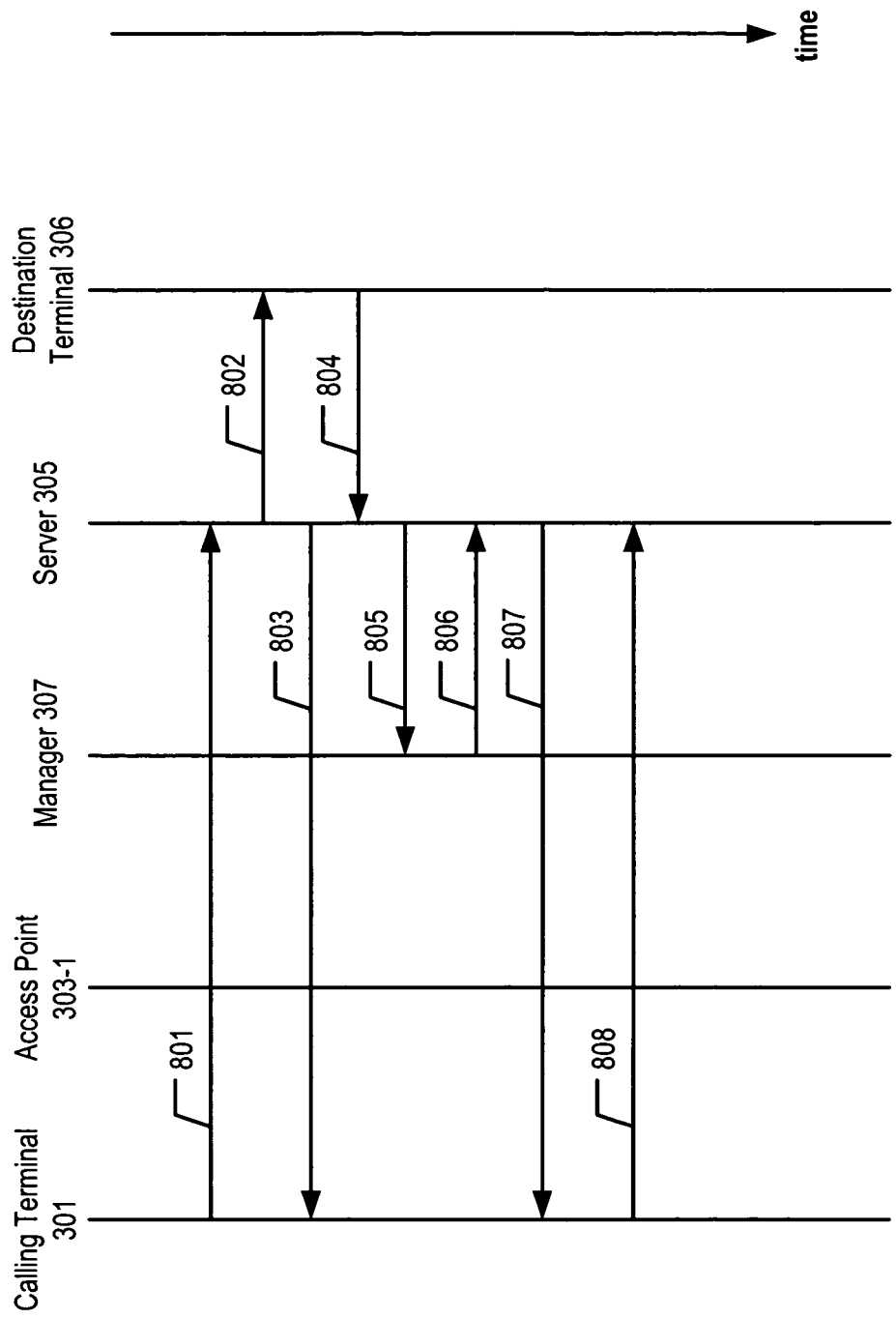
FIG. 8 depicts a diagram of the message flow associated with an example of the user of telecommunications terminal 301 calling a user at telecommunications terminal 306, wherein channel utilization manager 307 rejects the call.

FIG. 8 depicts a diagram of the message flow associated with an example of the user of telecommunications terminal 301 calling a user at telecommunications terminal 306, in accordance with the illustrative embodiment of the present invention, wherein channel utilization manager 307 rejects the call. Messages 801 through 805 and the events associated with those messages are the same as messages 701 through 705 and their associated events, described earlier and with respect to FIG. 7.

In this message flow, manager 307 determines that the call is not to be admitted and, as a result, transmits message 806 to server 305, indicating that it has rejected the call.

Consequently, server 305 then transmits message 807, a SIP error message (e.g., a "not acceptable here" message, etc.), to calling terminal 301, which acknowledges the message by transmitting message 808, a SIP ACK message.

Figure 9:
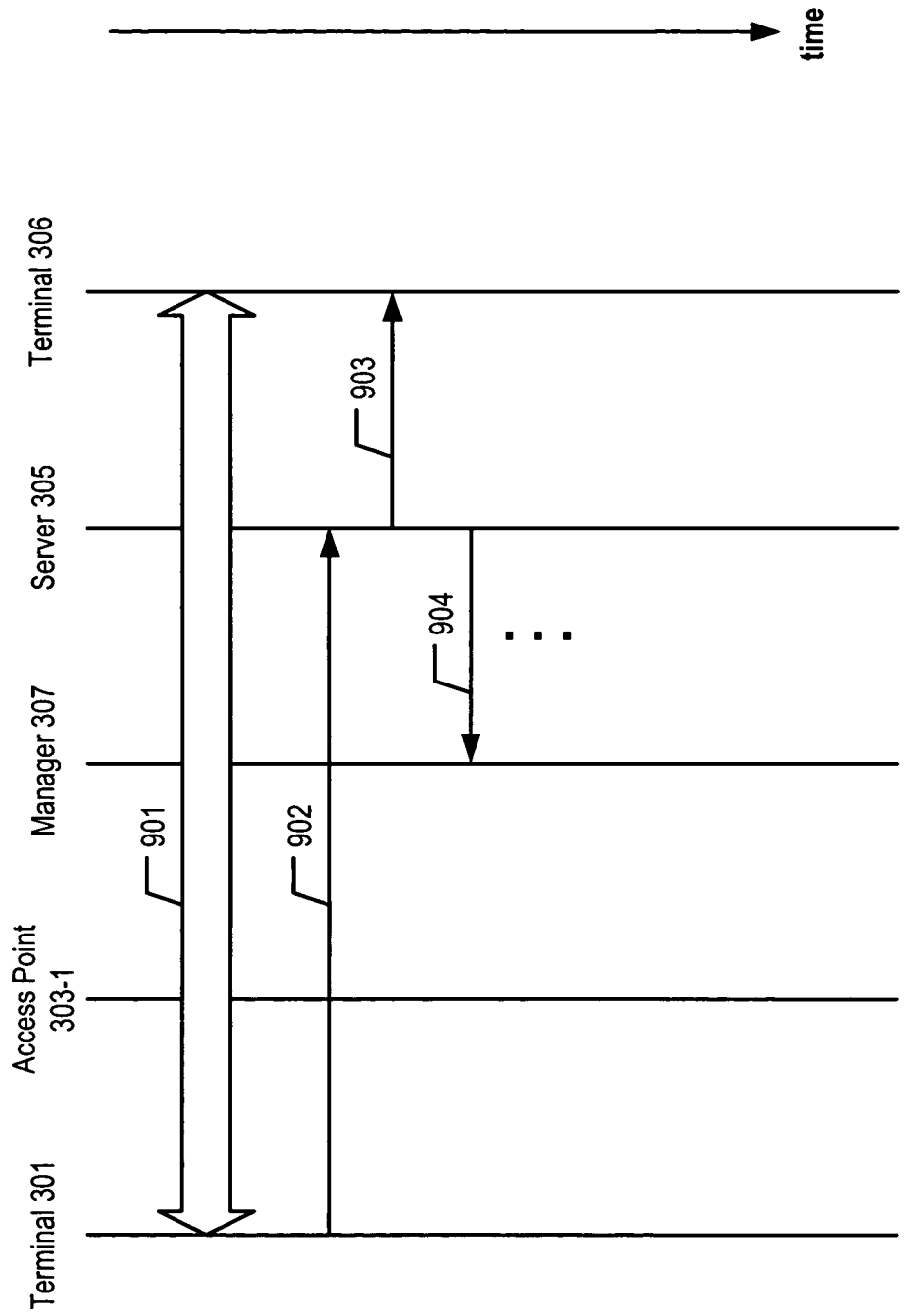
FIG. 9 depicts a diagram of the message flow associated with an example of telecommunications terminal 301 exchanging call traffic packets (e.g., voice traffic, video stream traffic, etc.) with telecommunications terminal 306, wherein terminal 301 ends the call.

FIG. 9 depicts a diagram of the message flow associated with an example of telecommunications terminal 301 exchanging call traffic packets (e.g., voice traffic, video stream traffic, etc.) with telecommunications terminal 306, in accordance with the illustrative embodiment of the present invention, wherein terminal 301 ends the call. In real-time protocol (RTP) stream 901, terminals 301 and 306 exchange traffic packets in well-known fashion.

At a point during the exchange, the user of terminal 301 enters a command to end the call, which results in terminal 301 transmitting message 902 to server 305. The server is able to receive notice of the call being ended because it has remained on the signaling path, as described earlier.

Server 305 transmits message 903, a SIP BYE message, to terminal 306, in which the message indicates that the call has ended.

Server 305 also transmits message 904, a notification that the call has ended, to channel utilization manager 307, in accordance with the illustrative embodiment. Manager 307 updates its database by deleting the record of the call and subtracting the amount of the resource used by the call from the current channel utilization level. Normal SIP call termination then continues in well-known fashion.

Figure 10:
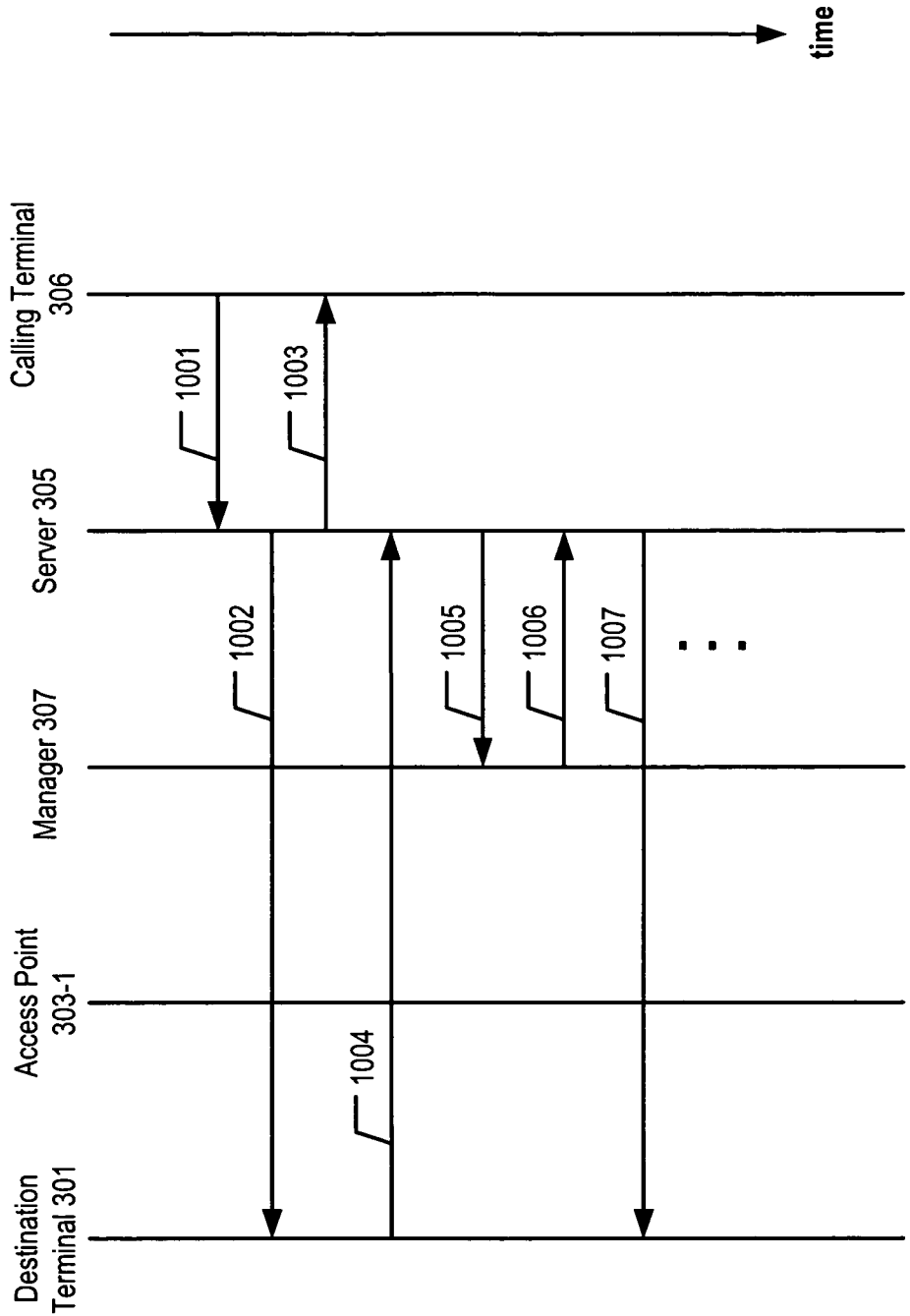
FIG. 10 depicts a diagram of the message flow associated with an example of the user of telecommunications terminal 306 calling a user at telecommunications terminal 301.

FIG. 10 depicts a diagram of the message flow associated with an example of the user of telecommunications terminal 306 calling a user at telecommunications terminal 301, in accordance with the illustrative embodiment of the present invention. In this scenario, wireless terminal 301 is the destination terminal and terminal 306 is the calling terminal. Terminal 306's user initiates the message flow by entering a command into terminal 306 to place a call to the other user. Terminal 306 transmits message 1001, a SIP INVITE message, to server 305. Message 1001 comprises (i) a traffic stream description as described above and with respect to FIG. 7 and (ii) the user identifier of the person being called.

Server 305 determines the destination terminal and transmits message 1002, a SIP OPTIONS message, to destination terminal 301 to determine the capabilities of that terminal. Server 305 also determines, in well-known fashion, from the destination terminal's Internet Protocol address that the server should remain on the signaling path used to receive the SIP INVITE message; accordingly, server 305 remains on the signaling path for at least part of the call, if admitted, in accordance with the illustrative embodiment.

Server 305 also transmits response message 1003, a SIP TRYING message, back to calling terminal 306.

Destination terminal 301 transmits message 1004 to server 305 (e.g., a SIP OK message, etc.), in response to message 1002.

Server 305 determines that terminal 301 is wireless and is served by an access point that is being managed by channel utilization manager 307, and that manager 307, as a result, has to be notified of the candidate call. Server 305 determines terminal 301's access method as described above and with respect to FIG. 7.

Subsequent to determining terminal 301's call dependency on manager 307, server 305 transmits message 1005 to manager 307. Message 1005 is a call setup traffic specification, as described above and with respect to FIG. 7. In some alternative embodiments, server 305 generates a communication resource requirement (e.g., channel utilization, etc.) of how much of the resource that manager 307 manages is needed to achieve a data-transmission requirement; server 305 then transmits that requirement as part of message 1005.

Channel utilization manager 307 receives message 1005 and stores the call setup traffic specification in a newly created record associated with the call. Manager 307 then determines whether it should admit the call on the shared-communications channel. Details on how manager 307 determines whether it should admit the call are provided above and with respect to FIG. 7.

In the message flow depicted in FIG. 10, manager 307 determines that the candidate call is to be admitted and, as a result, transmits acceptance message 1006 to server 305, indicating that the candidate call is admitted.

Server 305 then transmits message 1007, a SIP INVITE message, to destination terminal 301. Subsequently, server 305 continues to set up the call between terminals 301 and 306 in well-known fashion.

Figure 11:
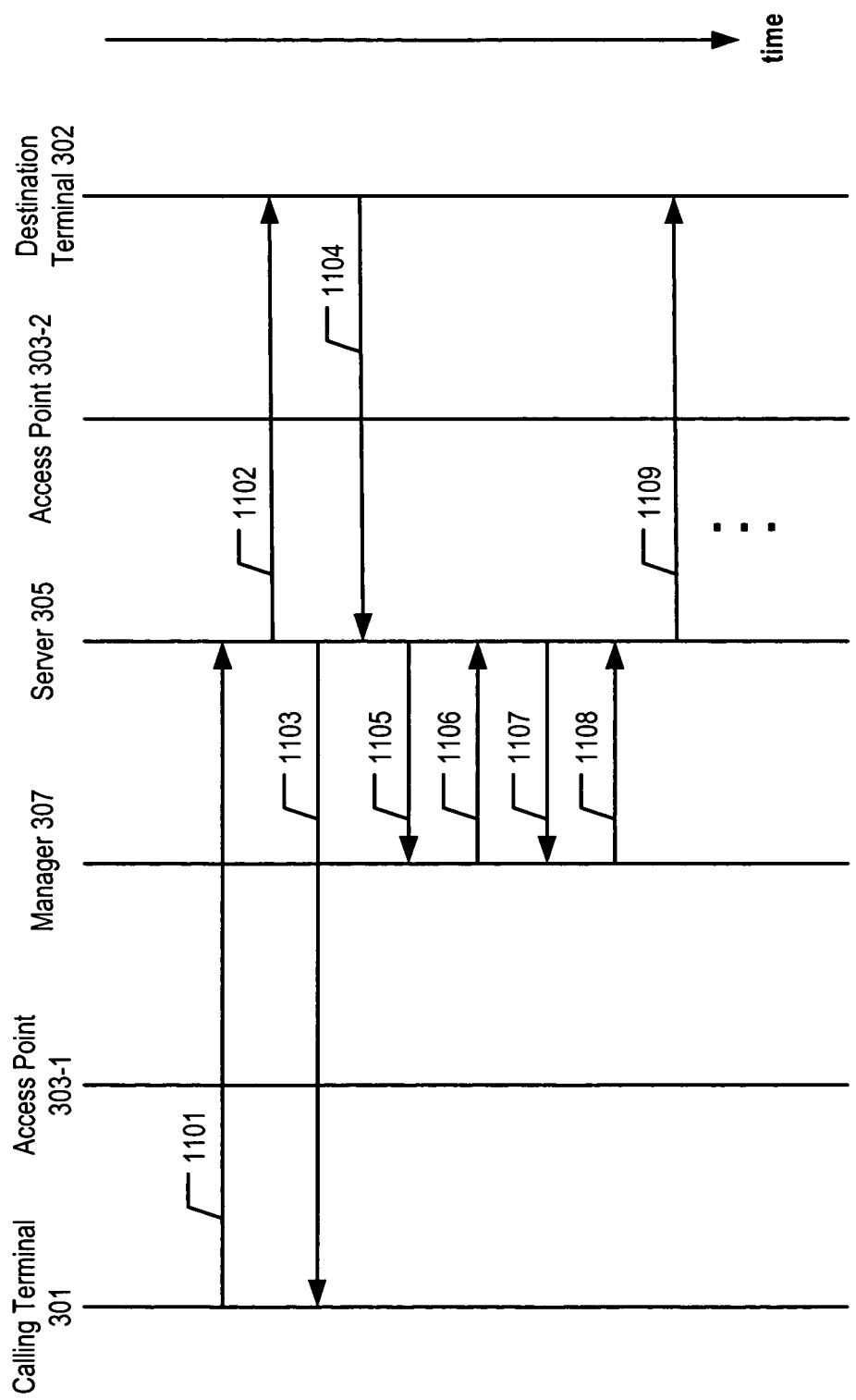
FIG. 11 depicts a diagram of the message flow associated with an example of the user of telecommunications terminal 301 calling a user at telecommunications terminal 302.

FIG. 11 depicts a diagram of the message flow associated with an example of the user of wireless telecommunications terminal 301 calling a user at wireless telecommunications terminal 302, in accordance with the illustrative embodiment of the present invention. Both terminals 301 and 302 are wireless and, as such, are subject to call admission control by manager 307. Terminal 301's user initiates the message flow by entering a command into terminal 301 to place a call to the other user. Terminal 301 transmits message 1101, a SIP INVITE message, to server 305. Message 1101 comprises (i) a traffic stream description as described above and with respect to FIG. 7 and (ii) the user identifier of the person being called.

Server 305 determines the destination terminal and transmits message 1102, a SIP OPTIONS message, to that terminal, in this case terminal 302, to determine the capabilities of the destination terminal. Server 305 also determines, in well-known fashion, from the calling terminal's Internet Protocol address that the server should remain on the signaling path used to receive the SIP INVITE message; accordingly, server 305 remains on the signaling path for at least part of the call, if admitted, in accordance with the illustrative embodiment.

Server 305 also transmits response message 1103, a SIP TRYING message, back to wireless terminal 301.

Destination terminal 302 transmits message 1104 to server 305 (e.g., a SIP OK message, etc.), in response to message 1102.

Server 305 determines that terminal 301 is wireless and is served by an access point (i.e., access point 303-1) that is managed by channel utilization manager 307, and that manager 307 has to therefore be notified of the candidate call. Server 305 determines terminal 301's access method as described above and with respect to FIG. 7.

Subsequent to determining terminal 301's call dependency on manager 307, server 305 transmits message 1105 to manager 307. Message 1105 is a call setup traffic specification, as described above and with respect to FIG. 7. In some alternative embodiments, server 305 generates a communication resource requirement (e.g., channel utilization, etc.) of how much of the resource that manager 307 manages is needed to achieve a data-transmission requirement; server 305 then transmits that resource requirement as part of message 1105.

Channel utilization manager 307 receives message 1105 and stores the call setup traffic specification in a newly created record associated with the call. Manager 307 determines whether it should admit the call on the shared-communications channel. Details on how manager 307 determines whether it should admit the call are provided above and with respect to FIG. 7.

In this message flow, manager 307 determines that the candidate call is to be admitted and, as a result, transmits acceptance message 1106 to server 305, indicating that the candidate call is admitted.

Similarly, server 305 determines that terminal 302 is also wireless and is served by an access point (i.e., access point 303-2) that is managed by channel utilization manager 307, and that manager 307 has to therefore be notified of the candidate call. Server 305 determines terminal 302's access method as described above and with respect to terminal 301.

Subsequent to determining terminal 302's call dependency on manager 307, server 305 transmits message 1107 to manager 307. Message 1107 is similar to message 1105, which is described above and with respect to terminal 301.

Channel utilization manager 307 receives message 1107 and stores the call setup traffic specification in a newly created record associated with the call. Manager 307 determines whether it should admit the call on the shared-communications channel, similarly to how it determined whether to admit the call based on terminal 301's presence. Details on how manager 307 determines whether it should admit the call are provided above and with respect to FIG. 7.

In this message flow, manager 307 determines that the candidate call is to be admitted and, as a result, transmits acceptance message 1108 to server 305, indicating that the candidate call is admitted.

Having received both acceptance messages 1106 and 1108, server 305 then transmits message 1109, a SIP INVITE message, to destination terminal 302. Subsequently, server 305 continues to set up the call between terminals 301 and 302 in well-known fashion.

In some alternative embodiments, server 305 could have transmitted one admission request to manager 307, instead of the two messages 1105 and 1107. Manager 305 would have then determined whether to accept the call based on the combined traffic specifications of both wireless terminals.

Figure 12:
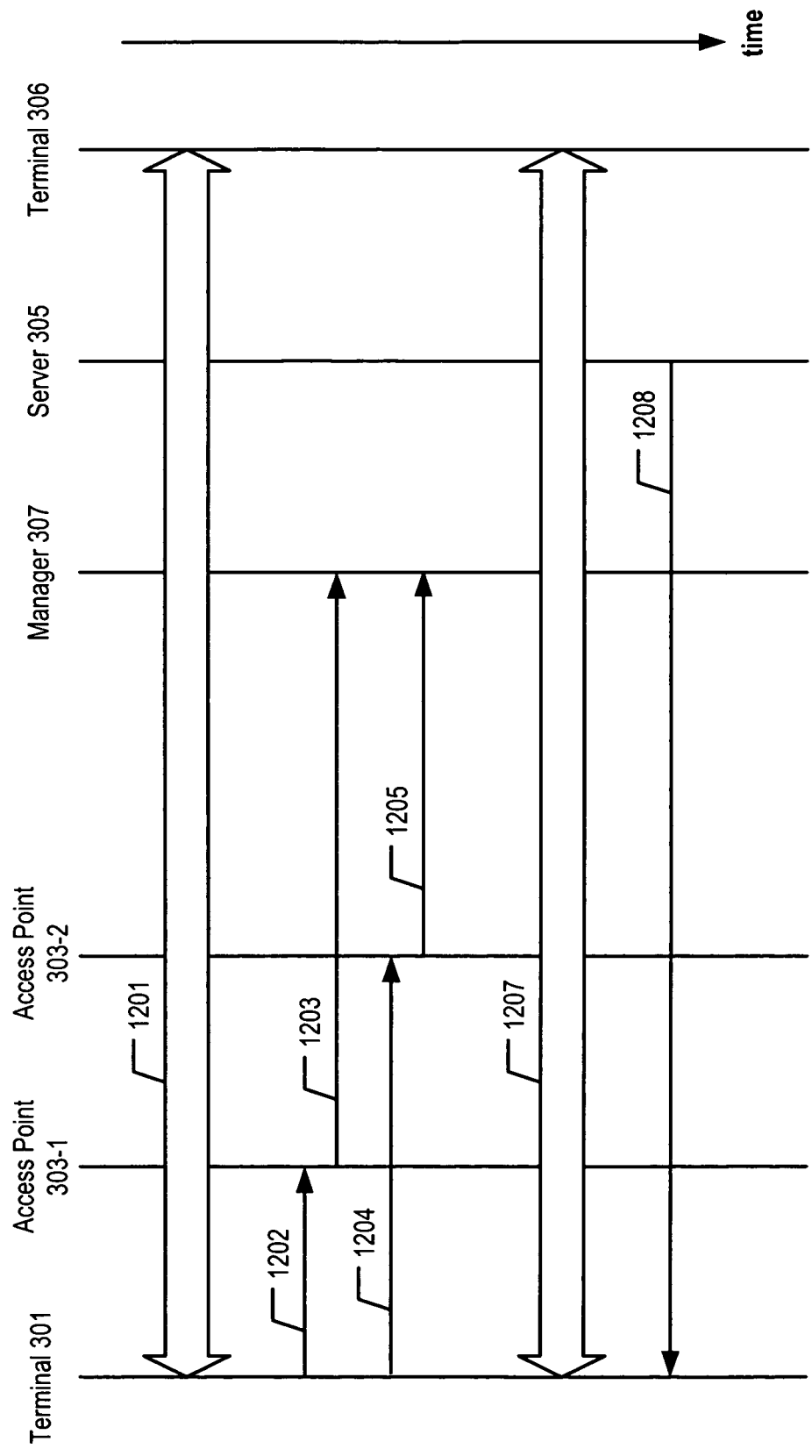
FIG. 12 depicts a diagram of the message flow associated with an example of telecommunications terminal 301 exchanging call traffic packets with telecommunications terminal 306, wherein terminal 301 moves from access point 303-1's coverage area to access point 303-2's coverage area.

FIG. 12 depicts a diagram of the message flow associated with an example of telecommunications terminal 301 exchanging call traffic packets with telecommunications terminal 306, in accordance with the illustrative embodiment of the present invention, wherein terminal 301 moves from access point 303-1's coverage area to access point 303-2's coverage area. In other words, system 300 performs a "handover" of terminal 301. In real-time protocol (RTP) stream 1201, terminals 301 and 306 exchange traffic packets in well-known fashion.

At some point during the call traffic exchange, terminal 301 disassociates with access point 303-1 via message 1202 and associates with access point 303-2 via message 1204, in well-known fashion. Accordingly, access point 303-1 transmits message 1203 in response to message 1202; access point 303-2 transmits message 1205 in response to message 1204, in which message 1205 comprises the Internet Protocol address and physical layer capabilities of terminal 301.

Manager 307 determines whether to admit the call, now that terminal 301 is associated with access point 303-2 and is using a new shared-communications channel. In accordance with the illustrative embodiment, manager 307 places a greater emphasis on admitting handover-related calls on a shared-communications channel than new calls. In order to effectively reserve channel resources for handover-related calls, manager 307 rejects new calls at a lower utilization level than that of handover calls. Nevertheless, if the utilization level exceeds the level at which handover calls are to be rejected, manager 307 transmits a message to server 305 that indicates to the server that the existing call is unacceptable and that it should drop the call.

In some alternative embodiments, handover-related calls are admitted unconditionally or are admitted if they are of a specified priority level (e.g., E911 calls, etc.). If overall quality-of-service on the utilized shared-communications channel deteriorates, manager 307 can drop other calls or further lower the utilization level at which new calls are rejected.

In this scenario, however, manager 307 accepts terminal 301 on the new shared-communications channel. With terminal 301 now associated with access point 303-2 and with manager 307 having accepted the call on the new channel, terminals 301 and 306 continue to exchange traffic packets in well-known fashion, as depicted by real-time protocol (RTP) stream 1207.

As those who are skilled in the art will appreciate, terminal 301 can continue to move into coverage areas served by other access points (e.g., access point 303-3, etc.) and similar call admission control will occur between the "old" access point, the "new" access point, and manager 307, in accordance with the illustrative embodiment of the present invention.

Figure 13:
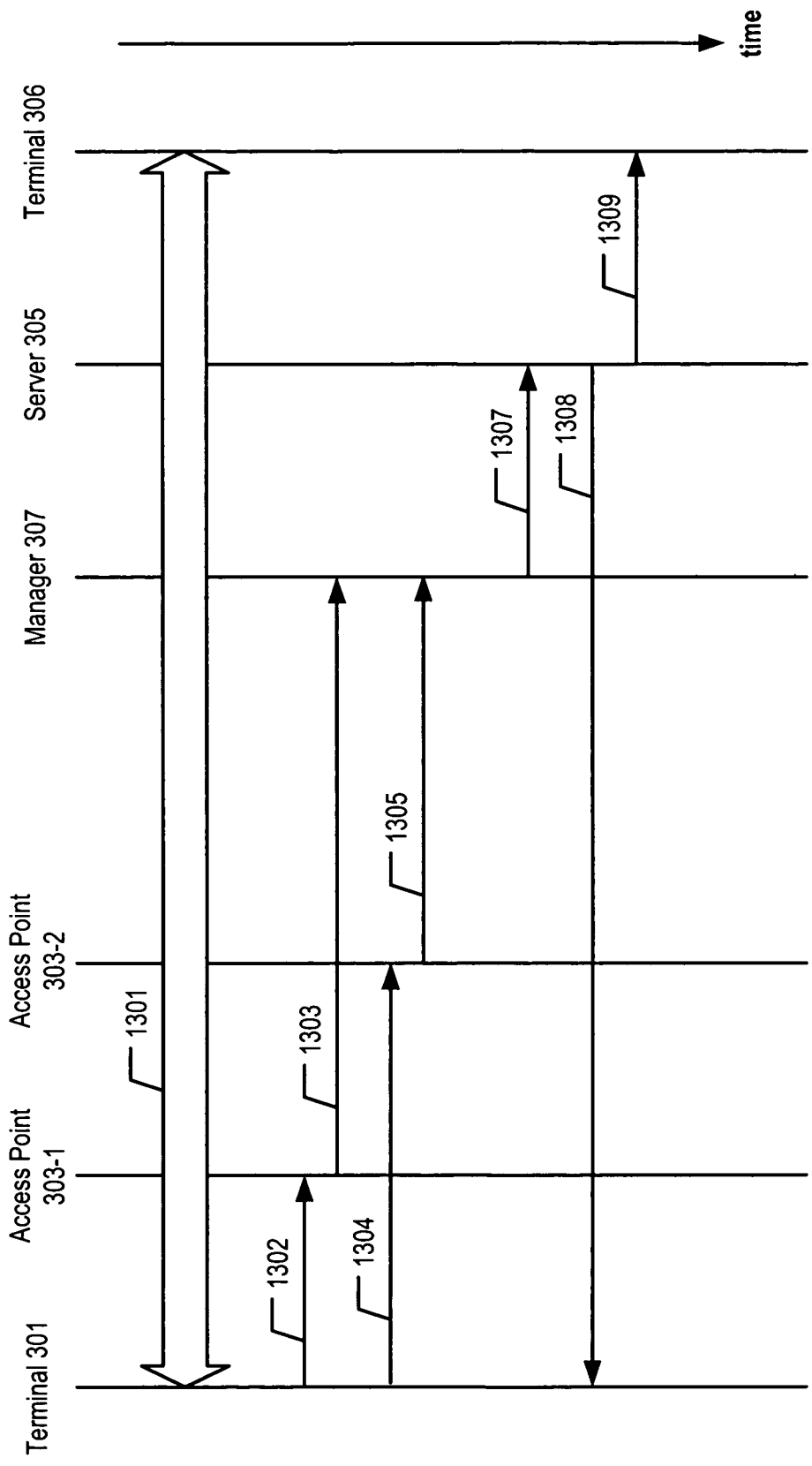
FIG. 13 depicts the handover scenario in which manager 307 rejects terminal 301 on the new shared-communications channel.

FIG. 13 depicts the handover scenario in which manager 307 rejects terminal 301 on the new shared-communications channel. Messages 1301 through 1306 and the events associated with those messages are the same as messages 1201 through 1206 and their associated events, described with respect to FIG. 12.

Manager 307 transmits message 1307 to server 405, indicating that the existing call should be dropped. As a result, server 305 transmits messages 1308 and 1309 to terminals 301 and 306, respectively, to end the call.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:

receiving, by a call-control server, a first Session Initiation Protocol-encoded message for a candidate call from a first telecommunications terminal, wherein the first Session Initiation Protocol-encoded message specifies a first data-transmission requirement for the candidate call;

transmitting, in response to receiving the first Session Initiation Protocol-encoded message, a first request message to a utilization manager that manages a call admission control of an access point that provides a wireless shared-communications channel that is to be considered for the candidate call, wherein the first request message requests admission of the candidate call to the wireless shared-communications channel and comprises the first data-transmission requirement;

receiving, by the call-control server from the utilization manager, an acceptance message, in response to the first request message, that indicates that the candidate call is admitted to the wireless shared-communications channel in accordance with the first data-transmission requirement; and continuing, by the call-control server in response to the acceptance message, a call setup for the candidate call via the wireless shared-communication channel.

2. The method of claim 1 further comprising:

receiving, by the call-control server, a second Session Initiation Protocol-encoded message for the candidate call from a second telecommunications terminal, wherein the second Session Initiation Protocol-encoded message specifies a second data-transmission requirement for the candidate call; and transmitting a second request message to the utilization manager, the second request message comprising the second data-transmission requirement;

wherein the acceptance message is received in response to the transmitting of both the first request message and the second request message.

3. The method of claim 1 wherein the first Session Initiation Protocol-encoded message is received on a signaling path, and further comprising remaining on the signaling path after the candidate call is admitted.

4. The method of claim 1 wherein the first request message is also based on at least one capability of a second telecommunications terminal, wherein the second telecommunications terminal is specified in the first Session Initiation Protocol-encoded message.

5. The method of claim 1 further comprising determining whether the first telecommunications terminal is wireless, wherein the transmitting of the first request message is based on whether the first telecommunications terminal is wireless.

6. The method of claim 5 wherein the determining of whether the first telecommunications terminal is wireless is based on whether the Internet Protocol address of the first telecommunications terminal is associated with an access point in a plurality of access points having call admission control that the utilization manager manages.

7. The method of claim 1 further comprising transmitting a SIP OPTIONS message to the first telecommunications terminal, wherein the candidate call is initiated by a second telecommunications terminal and directed to the first telecommunications terminal, and wherein the receiving of the first Session Initiation Protocol-encoded message is in response to the transmitting of the SIP OPTIONS message.

8. A method comprising:
receiving, by a call-control server, a first Session Initiation Protocol-encoded message for a candidate call from a first telecommunications terminal, wherein the first Session Initiation Protocol-encoded message specifies a first data-transmission requirement for the candidate call;

generating, by the call-control server, a requirement for a communication resource for the candidate call, the requirement being based on the first data-transmission requirement, wherein the communication resource is managed by a utilization manager that manages an access point that provides a wireless shared-communications channel that is to be considered for the candidate call;

transmitting a request message to the utilization manager, the request message requesting admission of the candidate call to the wireless shared-communications channel and comprising the requirement for the communication resource; and receiving, from the utilization manager, an acceptance message, in response to the transmitting of the request message, that indicates that the candidate call is admitted to the wireless shared-communications channel.

9. The method of claim 8 further comprising:
receiving, by the call-control server, a second Session Initiation Protocol-encoded message for the candidate call from a second telecommunications terminal, wherein the second Session Initiation Protocol-encoded message specifies a second data-transmission requirement for the candidate call;

wherein the generating of the communication resource requirement for the candidate call is also based on the second data-transmission requirement for the candidate call.

10. The method of claim 8 wherein the first Session Initiation Protocol-encoded message is received on a signaling path, and further comprising remaining on the signaling path after the candidate call is admitted.

11. The method of claim 8 wherein the request message is also based on at least one capability of a second telecommunications terminal, wherein the second telecommunications terminal is specified in the first Session Initiation Protocol-encoded message.

12. The method of claim 8 further comprising determining whether the first telecommunications terminal is wireless, wherein the transmitting of the request message is based on whether the first telecommunications terminal is wireless.

13. The method of claim 12 wherein the determining of whether the first telecommunications terminal is wireless is based on whether the Internet Protocol address of the first telecommunications terminal is associated with an access point in a plurality of access points that the utilization manager manages.

14. The method of claim 8 further comprising transmitting a SIP OPTIONS message to the first telecommunications terminal, wherein the candidate call is initiated by a second telecommunications terminal and directed to the first telecommunications terminal, and wherein the receiving of the first Session Initiation Protocol-encoded message is in response to the transmitting of the SIP OPTIONS message.

15. A method comprising:
receiving, by a call-control server, a Session Initiation Protocol-encoded message for a candidate call from a first telecommunications terminal via a signaling path, wherein the Session Initiation Protocol-encoded message specifies a data-transmission requirement for the candidate call;

transmitting, in response to receiving the Session Initiation Protocol-encoded message, a request message to a utilization manager that manages a call admission control of an access point that provides a wireless shared-communications channel that is to be considered for the candidate call, wherein the request message requests admission of the candidate call to the wireless shared-communications channel and comprises the data-transmission;

receiving a message from the utilization manager, in response to the request message, that indicates whether the candidate call is admitted to the wireless shared-communications channel; and when and only when the response message from the utilization manager indicates that the candidate call is admitted, continuing, by the call-control server, a call setup for the first candidate call via the wireless shared-communication channel;

when the message from the utilization manager indicates that the candidate call is rejected, transmitting, by the call-control server to the first telecommunications terminal, a SIP error message that prevents the candidate call from being setup via the wireless shared-communication channel.

16. The method of claim 15 wherein the access point is one of a plurality of access points having call admission control that the utilization manager manages.

17. The method of claim 15 wherein the request message is also based on at least one capability of a second telecommunications terminal, wherein the second telecommunications terminal is specified in the Session Initiation Protocol-encoded message.

18. The method of claim 15 further comprising determining whether the first telecommunications terminal is wireless, wherein the transmitting of the request message is based on whether the first telecommunications terminal is wireless.

19. The method of claim 18 wherein the determining of whether the first telecommunications terminal is wireless is based on the Internet Protocol address of the first telecommunications terminal.

20. The method of claim 15 further comprising transmitting a SIP OPTIONS message to the first telecommunications terminal, wherein the candidate call is initiated by a second telecommunications terminal and directed to the first telecommunications terminal, and wherein the receiving of the Session Initiation Protocol-encoded message is in response to the transmitting of the SIP OPTIONS message.

\* \* \* \* \*